United States Patent [19]
Bäbler

[11] Patent Number: 5,843,220
[45] Date of Patent: Dec. 1, 1998

[54] PROCESS FOR THE PREPARATION OF A PIGMENT COMPOSITION

[75] Inventor: Fridolin Bäbler, Hockessin, Del.

[73] Assignee: Ciba Specialty Chemicals Corporation, Tarrytown, N.Y.

[21] Appl. No.: 982,148

[22] Filed: Dec. 1, 1997

Related U.S. Application Data

[60] Provisional application Nos. 60/031,543 Dec. 21, 1996 and 60/058,219 Sep. 9, 1997.

[51] Int. Cl.$^6$ ..................................................... C09C 1/04
[52] U.S. Cl. ..................... 106/415; 106/31.6; 106/31.65; 106/31.75; 106/31.8; 106/31.9; 106/410; 106/411; 106/412; 106/415; 106/416; 106/417; 106/464; 106/465; 106/493; 106/494; 106/495; 106/496; 106/497; 106/498; 523/440
[58] Field of Search ..................................... 106/415, 416, 106/417, 464, 465, 493, 494, 495, 496, 497, 498, 410, 412, 411, 31.6, 31.65, 31.75, 31.8, 31.9; 523/440

[56] References Cited

U.S. PATENT DOCUMENTS

| | | | |
|---|---|---|---|
| 3,386,843 | 6/1968 | Jaffe et al. | 106/495 |
| 3,550,868 | 12/1970 | Stephanoff | 241/5 |
| 3,595,486 | 7/1971 | Stephanoff | 241/5 |
| 3,648,936 | 3/1972 | Stephanoff | 241/5 |
| 3,856,215 | 12/1974 | Van Vliet | 241/39 |
| 4,310,359 | 1/1982 | Ehashi et al. | 106/494 |
| 4,692,189 | 9/1987 | Bäbler et al. | 106/494 |
| 5,584,922 | 12/1996 | Babler | 106/417 |

*Primary Examiner*—Mark L. Bell
*Assistant Examiner*—Scott L. Hertzog
*Attorney, Agent, or Firm*—Kevin T. Mansfield

[57] ABSTRACT

The present invention relates to a process for preparing a pigment composition whereby a mixture of an organic pigment and an inorganic filler is subjected to an air jet milling step. The inventive process is an environmentally friendly process which yields pigments having outstanding dispersibility and wetting characteristics when incorporated in plastics, aqueous or solvent based coatings and inks.

29 Claims, No Drawings

PROCESS FOR THE PREPARATION OF A PIGMENT COMPOSITION

This application claims the benefit under 35 U.S.C. 119(e) of U.S. Provisional application Nos. 60/031,543, filed on Dec. 2, 1996 and 60/058,219, filed on Sep. 9, 1997.

SUMMARY

The present invention relates to a process for the preparation of a pigment composition whereby an inorganic filler and an organic pigment are combined and subjected to an air jet milling step.

BACKGROUND

It is known in the pigments industry that organic pigments, particularly those with a smaller particle size, for example below 1 µm, tend to aggregate. Thus, dry organic pigment powders consist of aggregates which need to be deaggregated before or during the pigmentation of a substrate in order to achieve optimum color strength and saturation.

In order to solve the problem of deaggregating small particle size pigments, pigment manufacturers often market such pigments in form of predispersed master batches. Otherwise, it is generally necessary for a paint manufacturer to disperse the small particle size organic pigments using bead mills during paint manufacture.

Air jet milling is known for grinding materials such as waxes, inorganic materials or food ingredients. However, it rarely is used for conditioning organic pigments because smaller particle size pigments can be obtained more efficiently by other conditioning methods, like, for instance, by wet or dry milling in bead mills.

Surprisingly, it has been discovered that refined pigment compositions containing from 1 to about 40 parts by weight of an inorganic filler and from about 60 to 99 parts by weight of an organic pigment, which are subjected to an air jet milling step, possess satisfactory pigment properties and overcome the problems associated with aggregation of the organic pigment. Moreover, the inventive process provides pigment compositions with enhanced pigment properties, such as outstanding dispersibility when incorporated in high molecular weight substrates like inks, plastics or paints. In particular, pigment compositions prepared by the present process manifest superior wetting behavior compared with small particle size pigments when applied as stir-in pigments in liquid systems, such as liquid colors or automotive paints. Surprisingly, pigment compositions prepared according to the inventive process are incorporated as stir-in pigments equally effectively in aqueous and solvent-based systems.

DETAILED DESCRIPTION

This invention relates to a process for preparing a pigment composition, which comprises air jet milling from 1 to 40 parts by weight of an inorganic filler in the presence of from 60 to 99 parts by weight of an organic pigment to yield a uniform blend of the inorganic filler and the organic pigment. In general, after the air jet milling step is completed the largest dimension of 95% of the particles in the resulting pigment composition is 18 µm or less, preferably 14 µm or less and most preferably about 7 to 10 µm, when measured for example by laser diffraction using a Fraunhofer diffraction instrument.

The inorganic filler is reduced in particle size in the presence of the organic pigment and uniformly blended with the organic pigment in the air jet mill according to the inventive process.

The inventive pigment compositions are "uniform blends" of the filler and organic pigment, a uniform blend being a physical mixture of the filler and pigment wherein the filler particles are evenly distributed in the pigment and mostly uncoated by the pigment. The term "mostly" is intended to mean that although there may be some coated particles in the pigment composition, such coated filler particles do not constitute a large portion of the filler particles in the pigment composition. The term "physical mixture" means that the pigment and filler particles are distinct from each other, especially when the pigment composition is dispersed.

In this application, the expression "pigment composition" is intended to mean a composition which is used to pigment a substrate, such as a high molecular weight organic material. Thus, the present pigment compositions do not include the pigmented substrate. Accordingly, the inventive pigment compositions can consist of or consist essentially of the filler and the organic pigment, and are generally powders. However, the inventive pigment compositions can also contain customary additives for pigment compositions, such as anti-flocculating agents, texture improving agents and light stabilizers.

The organic pigment and inorganic filler are added to the air jet mill individually, for example as separate streams, or are blended prior to the air jet milling step.

Typically, the organic pigment is blended with the inorganic filler prior to the air jet milling by wet or dry mixing of the components in the proper ratio. Wet mixing is carried out, for example, in the end step of a pigment preparatory process, or by blending the filler into an aqueous pigment slurry. Typically, a wet blended mixture needs to be dried and micropulverized prior to the air jet milling step. Preferably, the organic pigment is dry blended with the inorganic filler in a suitable container or in blending equipment, such as the TURBULA mixer from W. Bachofen, Basel, Switzerland, or the P-K TWIN-SHELL INTENSIFIER BLENDER from Patterson-Kelley Division, East Stroudsburg, Pa.

The organic pigment/inorganic filler blend is then subjected to the air jet milling procedure. Air jet milling is known and described, for example, in U.S. Pat. Nos. 3,856,215; 3,648,936; 3,595,486 and 3,550,868, and DE 2,042,626, which are here incorporated by reference. In general, air jet milling refers to a process whereby streams of solid particles are propelled against each other in a high pressure gaseous fluid so that the particles are pulverized by impacts with each other and with the walls of the mill. Air jet mills such as the JET-O-MIZER or MICRO-JET are commercially available from Fluid Energy Processing and Equipment Company, Plumsteadville, Pa. 18949. Air jet mills have also been referred to in the literature as fluid energy mills.

Generally, the present pigment compositions comprise from 60 to 99 parts by weight of the organic pigment and from 1 to 40 parts by weight of the filler. Preferably, the pigment compositions contain from about 65 to 95 parts by weight of the organic pigment and about 5 to 35 parts by weight of the filler, most preferably from about 70 to 90 parts by weight of the organic pigment and from about 10 to 30 parts by weight of the filler. The sum of the parts by weight of the organic pigment and inorganic filler is 100.

The expression "inorganic filler" means a substantially transparent inorganic pigment. For example, mica, kaolin, talc, wollastonite and natural or synthetic silica, e.g. glass, are well-known inorganic fillers that are suitable for use in the pigment compositions of the present invention.

Talc, muscovite mica and kaolin are highly suitable inorganic fillers. Talc and transparent micas are especially suitable for use as an inorganic filler. Of the micas, muscovite, phlogopite, brolite and synthetic micas are the most suitable.

The inorganic filler is preferably used in its natural form, but includes treated transparent or semitransparent inorganic filler pigments, for example a mica treated with a metal oxide, or talc treated with an organic aliphatic compound, such as a long chain aliphatic acid. In general, the inorganic filler consists of primary filler particles having any geometric shape, but a flaked shape is preferred.

Especially suitable classes of organic pigments include the azo, azomethine, methine, anthraquinone, phthalocyanine, perinone, perylene, diketopyrrolopyrrole, thioindigo, iminoisoindoline, iminoisoindolinone, quinacridone, flavanthrone, dioxazine, indanthrone, anthrapyrimidine and quinophthalone pigments; particularly preferred are the dioxazine, diketopyrrolopyrrole, quinacridone, anthraquinone, phthalocyanine, azo, indanthrone, iminoisoindoline or iminoisoindolinone pigments or a mixture or solid solution thereof.

Notable pigments useful in the present stir-in pigment compositions are those pigments described in the Color Index, including the group consisting of C.I. Pigment Red 202, C.I. Pigment Red 122, C.I. Pigment Red 179, C.I. Pigment Red 170, C.I. Pigment Red 144, C.I. Pigment Red 177, C.I. Pigment Red 254, C.I. Pigment Red 255, C.I. Pigment Red 264, C.I. Pigment Brown 23, C.I. Pigment Yellow 109, C.I. Pigment Yellow 110, C.I. Pigment Yellow 147, C.I. Pigment Yellow 191.1, C.I. Pigment Yellow 74, C.I. Pigment Yellow 83, C.I. Pigment Yellow 13, C.I. Pigment Orange 61, C.I. Pigment Orange 71, C.I. Pigment Orange 73, C.I. Pigment Orange 48, C.I. Pigment Orange 49, C.I. Pigment Blue 15, C.I. Pigment Blue 60, C.I. Pigment Violet 23, C.I. Pigment Violet 37, C.I. Pigment Violet 19, C.I. Pigment Green 7, and C.I. Pigment Green 36, or a mixture or solid solution thereof.

In general, the inorganic filler has a mean particle size in the range from 4 to 18 $\mu$m with 95% of the particles having a largest dimension of 70 $\mu$m or less prior to air jet milling. Preferably, 95% of the particles have a largest dimension below 60 $\mu$m, preferably below 50 $\mu$m, and a mean particle size in the range from 6 to 15 $\mu$m, preferably 8 to 12 $\mu$m, prior to air jet milling.

Generally, the organic pigment has an average particle size in the range of from 0.001 to 30 $\mu$m, preferably within the range from 0.005 to 3 $\mu$m, prior to the air jet milling step. Based on these average particle size ranges, it is clear that the organic pigment is used in the form of a pigment crude or a conditioned pigment. Additionally, the organic pigment can contain customary additives, such as texture improving agents, light stabilizers and/or antiflocculating agents.

Appropriate texture-improving agents include fatty acids having at least 12 carbon atoms, and amides, esters or salts of fatty acids. Typical fatty acid derived texture-improving agents include fatty acids such as stearic acid or behenic acid, and fatty amines such as laurylamine, or stearylamine. In addition, fatty alcohols or ethoxylated fatty alcohols, polyols such as aliphatic 1,2-diols or polyvinylalcohol, and polyvinyl pyrrolidone, polyacrylic acid and copolymers thereof, epoxidized soya bean oil, waxes, resin acids and resin acid salts are suitable texture-improving agents.

Antiflocculating agents, also described as rheology improving agents or particle growth inhibitors, are well known in the pigment industry and are, for example, pigment derivatives such as the sulfonic acid, sulfonic acid salts or sulfonamide derivatives of organic pigments. Typically rheology improving agents are used in a concentration of 0.5 to 8 percent based on the weight of the organic pigment.

Light stabilizers, such as U.V. absorbers and hindered amine light stabilizers, are known in the art and suitable as additives for the present pigment compositions.

The texture-improving agent, light stabilizer and/or antiflocculating agent is incorporated into the composition before, during or after the air jet milling step. Preferably, these additives are added prior to the air jet milling step, most preferably before the isolation or drying of the organic pigment after synthesis or conditioning.

Surprisingly, the air-jet milling of the organic pigment/inorganic filler blend according to this invention provides pigment compositions which show an outstanding dispersibility and wetting behavior in organic as well as aqueous application media.

Highly aggregated organic pigment powders are easily deaggregated when air-jet milled in the presence of the inorganic filler according to this process. Thus, pigment compositions made from direct pigmentary or very small-particle-size, highly transparent, conditioned organic pigments, which generally have a pigment particle size below 0.1 $\mu$m and a specific surface area of above around 40 $m^2/g$ and are known for their hard texture, are easily incorporated as stir-in pigments in solvent- and aqueous-based automotive paint systems by stirring for about 20 minutes to 1 hour. Normally, small particle size organic pigments require 20 hours or longer of dispersion milling for dispersion in automotive paint systems.

The presence of the inorganic filler is necessary in order to run the air-jet mill in a proper and efficient way and to achieve pigment compositions having the desired properties.

Depending on the corresponding inorganic filler and/or organic pigment, pigment compositions with characteristic coloristic pigment properties, not previously obtainable, are now possible. For example, the presence of a flaky inorganic filler can enhance the luster and flop behavior of the pigment compositions, particularly, when applied in conjunction with known effect pigments such as for example $TiO_2$-coated mica, aluminum or graphite pigments.

Since no organic solvents are involved, the air jet milling process is a practical, environmentally friendly conditioning method. The desired particle size range is easily achieved by a person familiar with the process by utilizing the appropriate equipment and air pressure. Additionally, it is possible to run some air jet mills continuously. The requisite milling conditions are readily ascertained by measuring the pigment particle size; for example with an electron micrograph or by laser diffraction using a Fraunhofer diffraction instrument, and adjusting conditions to yield particles having the desired characteristics.

Due to their enhanced pigment properties, the pigment compositions according to this invention are highly suitable for the coloration of various substrates, such as inorganic materials, and in particular high molecular weight organic materials. Thus, the present invention also relates to a process for preparing a pigmented high molecular weight organic material, which process comprises the steps of:

(a) air jet milling from 1 to 40 parts by weight of an inorganic filler in the presence of from 60 to 99 parts by weight of an organic pigment to yield a pigment composition which is a uniform blend of the inorganic filler and the organic pigment; and (b) incorporating an effective pigmenting amount of the pigment composition into the high molecular weight organic material.

Generally, an effective pigmenting amount of the pigment composition is incorporated into the high molecular weight organic material to be pigmented. An effective pigmenting amount is any amount suitable to provide the desired color in the high molecular weight organic material. In particular, the inventive pigment composition is used in an amount of 0.01 to 30% by weight, preferably 0.1 to 10% by weight, based on the weight of the high molecular weight organic material to be pigmented.

The pigmented, high molecular weight organic materials which are colored with the inventive pigment composition are useful in a variety of applications. For example, the inventive pigment compositions are useful for the pigmentation of lacquers, inks, enamel coating compositions or engineering plastics.

The high molecular weight organic materials which are colored with the inventive pigment compositions are, for example, cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine, formaldehyde resins, urea/formaldehyde resins, epoxy resins and diene rubbers or copolymers thereof.

High molecular weight organic materials which are useful for heat-curable coatings or cross-linking, chemically-reactive coatings, are also colored with the inventive pigment composition. The pigmented, high molecular weight organic materials prepared according to the present invention are especially useful in stoving finishes which contain the customary binders and which are reactive at high temperature. Examples of the pigmented, high molecular weight organic materials which are used in coatings include acrylic, alkyd, epoxy, phenolic, melamine, urea, polyester, polyurethane, blocked isocyanate, benzoguanamine or cellulose ester resins, or combinations thereof. The pigmented, high molecular weight organic materials prepared according to the present invention are also useful as air-drying or physically-drying coatings.

The inventive pigment compositions are particularly suitable for preparing liquid colors or coatings conventionally employed in the automobile industry, especially in acrylic/melamine resin, alkyd/melamine resin or thermoplastic acrylic resin systems, as well as in aqueous based coating systems, which are used for automotive paint systems.

The inventive pigment compositions containing small particle size organic pigments are highly suitable for the preparation of transparent shades, for example in plastic films or thermoplastic fibers. Thus, the inventive process is useful for pigmenting plastics which are calendared, cast, molded, or processed to fibers.

Despite the presence of the colorless inorganic filler, the inventive pigment compositions show a high color strength. This is believed to be due to a deaggregation effect and partially due to comminution of the organic pigment during the air jet milling process.

The present process is especially useful for pigmenting a high molecular weight organic material which is a coating composition. Preferably, the pigment composition is incorporated into the coating composition as a stir-in pigment, by stirring for a relatively short time without a dispersion milling step.

The present invention further relates to a pigment composition which is a uniform blend comprising from 60 to 99 parts by weight of an organic pigment and from 1 to 40 parts by weight of an inorganic filler, wherein the sum of the parts by weight of the organic pigment and inorganic filler is 100, and wherein the largest dimension of 95 percent of the particles in the pigment composition is 18 μm or less, which pigment composition is prepared by air jet milling the inorganic filler in the presence of the organic pigment.

Preferably, the largest dimension of 95 percent of the particles in the pigment composition is 14 μm or less; most preferably 10 μm or less.

Generally, the pigment composition has a unimodal laser diffraction particle size distribution pattern with a maximum in the range from 0.1 to 8 μm, preferably from 0.2 to 5 μm; or a bimodal laser diffraction particle size distribution pattern with a first maximum in the range from 0.1 to 3 μm, preferably from 0.2 to 2.5 μm, due to the organic pigment and a second maximum in the range from 3 to 10 μm, preferably from 3.2 to 8 μm, due to the filler.

Especially useful compositions are those wherein the inorganic filler is selected from the group consisting of mica, kaolin, talc, wollastonite and a natural or synthetic silica. Preferably, the inorganic filler is mica, kaolin or talc.

The organic pigment is an azo, azomethine, methine, anthraquinone, dioxazine, phthalocyanine, perinone, perylene, diketopyrrolopyrrole, thioindigo, iminoisoindolinone, iminoisoindoline, quinacridone, flavanthrone, indanthrone, anthrapyrimidine, quinophthalone pigment, or a mixture or solid solution thereof.

Preferably, the pigment composition contains from 5 to 35 parts by weight of the inorganic filler and from 65 to 95 parts by weight of the organic pigment. Most preferably, the pigment composition contains from 10 to 30 parts by weight of the inorganic filler and from 70 to 90 parts by weight of the organic pigment.

The following examples further describe some embodiments of the invention, but do not limit the scope of the invention. In the examples, all parts are by weight unless otherwise indicated. The particle size of the pigments was measured by laser diffraction analysis on a MICROTRAC Model 9200, Vibracell Model VC50 Ultrasonic probe, Probe Model V1A (from Leeds & Northrup Company) by dispersing the pigment samples in tap water. This method does not provide the primary particle size of pigments having a particle size below around 0.2 μm, but rather the particle size of small aggregates. However, the procedure is reliable for measuring particle sizes of 5 μm and larger.

EXAMPLE 1

750 grams of IRGAZIN® DPP Red BO (a commercial 3,6-di(4-chlorophenyl)-1,4-diketopyrrolo[3,4-c]-pyrrole pigment from CIBA Specialty Chemicals Corp.) and 250 grams talc with 95% of the particles below about 50 μm and a mean particle size of 9.3 μm (CANFIL 7 from Canada Talc Ltd., Ontario, Canada) are dry blended in a container on a roller gear for 2 hours. The red mixture is air jet milled with a MICRO-JET® air pulverizer (from Fluid Energy Aljet, Plumsteadville Pa.) to yield a red pigment composition with 95% of the particles having a largest dimension of 14 μm or below.

The resulting product shows a particle size distribution of 30% from 0.2 to 0.4 μm, 40% from 0.4 to 0.6 μm and 30% from 0.6 to 14 μm measured by a laser diffraction particle size analyzer (MICROTRAC). The laser diffraction particle size distribution pattern shows a bimodal curve having the first maximum at 0.4 to 0.5 μm (organic pigment) and the second maximum at 5 μm (talc).

The red pigment composition shows a high color strength, excellent pigment properties, an outstanding dispersibility behavior when applied in a high molecular weight material, and which can be incorporated as a stir-in pigment in aqueous and solvent based paint systems.

EXAMPLE 2

The procedure of Example 1 is repeated, but replacing the IRGAZIN® DPP Red BO with a 3,6-diphenyl-1,4-diketopyrrolo[3,4-c]-pyrrole pigment, yielding a yellowish-red pigment composition having good pigment quality.

The resulting product shows a particle size distribution of 30% from 0.2 to 0.5 µm, 40% from 0.5 to 0.9 µm and 30% from 0.9 to 11 µm measured by a laser diffraction particle size analyzer (MICROTRAC). The laser diffraction particle size distribution pattern shows a bimodal curve having the first maximum at 0.5 to 0.6 µm (organic pigment) and the second maximum at 4.5 µm (talc).

EXAMPLE 3

The procedure of Example 1 is repeated, but replacing the IRGAZIN® DPP Red BO with MONASTRAL® Red Y RT-759-D (a commercial gamma-quinacridone pigment from CIBA Specialty Chemicals Corp.) yielding a bluish-red pigment composition having good pigment quality.

The resulting product shows a particle size distribution of 30% from 0.2 to 0.5 µm, 40% from 0.5 to 0.7 µm and 30% from 0.7 to 8 µm measured by a laser diffraction particle size analyzer (MICROTRAC). The laser diffraction particle size distribution pattern shows a bimodal curve having the first maximum at 0.4–0.5 µm (organic pigment) and the second maximum at 3.5 µm (talc).

EXAMPLE 4

The procedure of Example 1 is repeated, but replacing the IRGAZIN® DPP Red BO with a highly transparent, commercially available quinacridone/diketodiarylpyrrolopyrrole solid solution pigment, MONASTRAL® Red RT-280-D from CIBA Specialty Chemicals Corp., yielding a bluish-red pigment composition having good pigment quality.

The resulting product shows a particle size distribution of 30% from 0.3 to 1 µm, 40% from 1 to 2 µm and 30% from 2 to 9 µm measured by a laser diffraction particle size analyzer (MICROTRAC). The laser diffraction particle size distribution pattern shows a unimodal curve having a maximum at 1.03 µm.

Due to its high transparency and excellent weatherability the pigment is particularly interesting in automotive paint systems. It shows an outstanding dispersibility behavior and is incorporated into both aqueous- and solvent-based automotive paint systems as a stir-in pigment.

EXAMPLE 5

The procedure of Example 4 is repeated, but replacing the MONASTRAL® Red RT-280-D with a semi-opaque, commercial 2,9-dichloroquinacridone pigment, MONASTRAL® Magenta B RT-343-D from Ciba Specialty Chemicals Corp., yielding a magenta-colored pigment composition with good pigment quality.

The resulting product shows a particle size distribution of 30% from 0.2 to 0.9 µm, 40% from 0.9 to 1.8 µm and 30% from 1.8 to 13 µm measured by a laser diffraction particle size analyzer (MICROTRAC). The laser diffraction particle size distribution pattern shows a unimodal curve having a maximum at 0.9 to 1 µm.

EXAMPLE 6

The procedure of Example 4 is repeated replacing the MONASTRAL® Red RT-280-D with a highly transparent resinated diketopyrrolopyrrole pigment, C.I. Pigment Red 254, treated with 7% Ca-salt of a rosin acid based on the pigment, yielding a red-colored pigment composition with excellent pigment quality.

The resulting product shows a particle size distribution of 30% from 0.2 to 0.9 µm, 40% from 0.9 to 2 µm and 30% from 2 to 9.3 µm measured by a laser diffraction particle size analyzer (MICROTRAC). The laser diffraction particle size distribution pattern shows a unimodal curve having a maximum at around 1 µm.

EXAMPLE 7

This example demonstrates the incorporation of a pigment composition containing a very small particle size organic pigment with a primary pigment particle size of below 0.1 µm in an aqueous automotive paint system, without a dispersion step, directly as a stir-in pigment.

"stir-in pigment dispersion"

A pint jar is charged with 41.6 grams polymeric aqueous dispersant and 102 grams deionized water. The mixture is stirred for 5 to 10 minutes. 21.5 grams of the pigment composition prepared according to Example 4 is added by stirring at medium speed into the aqueous resin dispersion to yield a pigment dispersion. The red pigment dispersion is stirred at medium speed for 15 minutes yielding a homogenous "stir-in pigment dispersion" containing 13.0% pigment composition, with a total solids content of 26% and a pigment/binder ratio of 1.0.

"russet mica dispersion"

A pint jar is charged with 15.0 grams russet mica (MEARL Corp.), 4.0 grams ISOPAR M (Textile Chemical), 11.9 grams butyl cellosolve and 5.4 grams hexyl cellosolve and stirred for 20 to 30 minutes to yield a mica dispersion. The mica dispersion is diluted with 17.4 grams deionized water and 46.3 grams latex dispersion. The pH is adjusted to 8.1 to 8.3 by the addition of 2-amino-2-methyl-1-propanol.

"paint dispersion"

The following are mixed:
19.0 grams "stir-in pigment dispersion"
16.5 grams "russet mica dispersion"
36.4 grams compensating clear color resin solution, and
28.1 grams balanced clear color resin solution.

The viscosity of the resulting paint dispersion is adjusted to 1500–2000 cps with deionized water and by the addition of 2-amino-2-methyl-1-propanol to a pH of around 7.6, and then sprayed onto a panel twice in a 1.5 minute interval as basecoat. After 2 minutes, a solvent based clearcoat resin is sprayed twice at 1.5 minute intervals onto the basecoat. The sprayed panel is then flashed with air in a flash cabinet for 10 minutes and then "baked" in an oven at 265° F. (130° C.) for 30 minutes, yielding a high chroma, red, effect-colored panel with excellent weatherability. A microscopic evaluation shows a homogeneous distribution of the pigment particles in the coating system

EXAMPLE 8

This example demonstrates the incorporation of a pigment composition containing a very small particle size organic pigment with a primary pigment particle size of below 0.1 μm in a solvent-based automotive basecoat/clearcoat paint system, without a dispersion step, directly as a stir-in pigment.

"stir-in pigment dispersion"

A pint jar is charged with 41.3 grams acrylic resin solution, 8.9 grams AB dispersant and 98.3 grams solvent (SOLVESSO 100). The mixture is shaken on a shaker for 10 minutes. 16.5 grams of the pigment composition prepared according to Example 4 are added with stirring at medium speed for 15 minutes to yield a red stir-in pigment dispersion containing 10.0% pigment composition, with a total solids content of 30% and a pigment/binder ratio of 0.5.

"russet mica dispersion"

A quart can is charged with 251 grams russet mica, 315 grams nonaqueous dispersion resin and 180 grams acrylic urethane resin. The mixture is stirred until lump free.

"paint dispersion"

40.3 grams "stir-in pigment dispersion", 12 grams "russet mica dispersion", 35.3 grams compensating clear color resin solution, and 12.5 grams balanced clear color resin solution are mixed. The viscosity is reduced to 20–22 seconds as measured using a No. 2 Fisher device by a thinning solvent mixture of the following composition: 76 grams xylene, 21 grams butanol and 3 grams methanol. The red-colored resin/pigment dispersion is sprayed onto a panel twice at 1 minute intervals as basecoat. After 3 minutes, clearcoat resin is sprayed twice at 1 minute intervals onto the basecoat. The sprayed panel is then flashed with air in a flash cabinet for 10 minutes and then "baked" in an oven at 265° F. (130° C.) for 30 minutes, yielding a high chroma, red, effect-colored panel, with excellent weatherability. A microscopic evaluation shows a homogeneous distribution of the pigment particles in the coating system.

EXAMPLE 9

This example demonstrates the incorporation of a pigment composition containing a semi-opaque organic pigment with a primary pigment particle size of below 0.2 μm in an solvent-based metallic automotive paint system, without a dispersion step, directly as a stir-in pigment.

"stir-in pigment dispersion"

A pint jar is charged with 66 grams non-aqueous resin dispersion, 14.5 grams AB dispersant and 58.1 grams solvent. The mixture is shaken on a shaker for 10 minutes. 26.4 grams of the pigment composition prepared according to Example 5 are added with stirring at medium speed for 15 minutes providing a homogenous "stir-in pigment dispersion" containing 16.0% pigment composition, with a total solids content of 48% and a pigment/binder ratio of 0.5.

"metallic dispersion"

A quart can is charged with 405 grams aluminum paste (5245AR from Silberline), 315 grams non-aqueous dispersion resin and 180 grams acrylic urethane resin and stirred for 1 to 2 hours until lump free.

"paint dispersion"

25.9 grams "stir-in pigment dispersion", 14.8 grams "metallic dispersion", 36.2 grams compensating clear color resin solution and 23.1 grams balanced clear color solid solution are mixed. The viscosity is reduced to 20–22 seconds as measured using a No. 2 Fisher device by a thinning solvent mixture of the following composition: 76 grams xylene, 21 grams butanol and 3 grams methanol. The magenta-colored resin/pigment dispersion is sprayed onto a panel twice at one minute intervals as basecoat. After 3 minutes, clearcoat resin is sprayed twice at one minute intervals onto the basecoat. The sprayed panel is then flashed with air in a flash cabinet for 10 minutes and then "baked" in an oven at 265° F. (130° C.) for 30 minutes, yielding a high chroma, metallic, magenta-colored panel with excellent weatherability. A microscopic evaluation shows a homogeneous distribution of the pigment particles in the coating system.

EXAMPLE 10

This example demonstrates the incorporation of a pigment composition containing an opaque organic pigment with a primary pigment particle size of around 0.2 to 0.5 μm into a monocoat high solid enamel automotive coating system, without a dispersion step, directly as a stir-in pigment.

"stir-in pigment dispersion"

64.2 grams of high solids acrylic resin, 14.4 grams of AB-dispersant and 60.1 grams of xylene are combined in a quart can and shaken for 10 minutes. 26.4 grams diketopyrrolopyrrole pigment composition obtained according to Example 1 are added as a stir-in pigment with stirring for 15 minutes yielding a homogenous, non-viscous "stir-in pigment dispersion" containing 16% diketopyrrolopyrrole pigment composition, with a total solids content of 48% and a pigment/binder ratio of 0.5.

"paint dispersion"

54.6 grams of the above "stir-in pigment dispersion", 17.5 grams of high-solids acrylic resin, 21.6 grams of melamine resin, and 31.3 grams of solid clear color resin solution are combined with stirring. The red resin/pigment dispersion is thinned with solvent to a spray viscosity of 28 seconds as determined by a #4 Ford cup and sprayed onto a panel three times in a 2 minute interval. The sprayed panel is then flashed with air in a flash cabinet for 10 minutes then "baked" in an oven at 265° F. (130° C.) for 30 minutes yielding a high chroma red-colored panel, with excellent weatherability. The panel shows an even high gloss surface with excellent weatherability and opacity.

EXAMPLE 11

63.0 grams of polyvinylchloride, 3.0 grams epoxidized soya bean oil, 2.0 grams of barium/cadmium heat stabilizer, 32.0 grams dioctyl phthalate and 1.0 gram of the pigment composition prepared according to Example 3 are mixed together in a glass beaker using a stirring rod. The mixture is formed into a soft PVC sheet with a thickness of about 0.4 mm by rolling for 8 minutes on a two roll laboratory mill at a temperature of 160° C., a roller speed of 25 rpm and friction of 1:1.2 by constant folding, removal and feeding. The resulting soft PVC sheet is colored in an attractive bluish-red shade with excellent fastness to heat, light and migration.

EXAMPLE 12

Five grams of the pigment composition prepared according to Example 1, 2.5 grams hindered amine light stabilizer, 1.0 gram benzotriazole UV absorber, 1.0 gram hindered phenol antioxidant and 1.0 gram phosphite process stabilizer, all from Ciba Specialty Chemicals Corp., are mixed together with 1000 grams of high density polyethylene at a speed of 175–200 rpm for 30 seconds after flux. The fluxed pigmented resin is chopped up while warm and malleable, and then fed through a granulator. The resulting granules are molded on an injection molder with a 5 minute dwell time and a 30 second cycle time at temperature of 260° C. Homogeneously colored chips which show a bright red color with excellent light stability are obtained.

Similar results are achieved starting from 12.5 grams of a liquid color suspension comprising the liquid vehicle and the pigment composition obtained according to Example 1 in a concentration of 40%. The liquid color suspension was prepared by simply stirring the pigment composition into the liquid vehicle without a dispersion step in a high shear mixer.

EXAMPLE 13

1000 grams of polypropylene granules (DAPLEN PT-55 from Chemie Linz) and 10 grams of the pigment composition of Example 4 are thoroughly mixed in a mixing drum. The granules so obtained are melt spun at 260°–285° C. to red filaments of good light fastness and textile fiber properties.

In addition to the embodiments described above, numerous variations of these embodiments can be made in accordance with the teachings above.

I claim:

1. A process for preparing a pigment composition, which comprises air jet milling from 1 to 40 parts by weight of an inorganic filler in the presence of from 60 to 99 parts by weight of an organic pigment to yield a uniform blend of the inorganic filler and the organic pigment.

2. A process of claim 1, wherein the largest dimension of 95 percent of the particles in the pigment composition is 18 $\mu$m or less.

3. A process of claim 2, wherein the largest dimension of 95 percent of the particles in the pigment composition is 14 $\mu$m or less.

4. A process of claim 3, wherein the largest dimension of 95 percent of the particles in the pigment composition is about 7–10 $\mu$m.

5. A process of claim 1, wherein the organic pigment and the inorganic filler are added to the air jet mill individually.

6. A process of claim 1, wherein the organic pigment and filler are combined prior to the air jet milling step.

7. A process of claim 1, wherein the pigment composition comprises from 5 to 35 parts by weight of the filler and from 65 to 95 parts per weight of the organic pigment.

8. A process of claim 7, which comprises from 10 to 30 parts by weight of the filler and from 70 to 90 parts by weight of the organic pigment.

9. A process of claim 1, wherein the inorganic filler is selected from the group consisting of mica, kaolin, talc, wollastonite and natural or synthetic silica or a mixture thereof.

10. A process of claim 9, wherein the inorganic filler is talc, muscovite mica, kaolin or a mixture thereof.

11. A process of claim 1, wherein the organic pigment is an azo, azomethine, methine, anthraquinone, phthalocyanine, perinone, perylene, dioxazine, diketopyrrolopyrrole, thioindigo, iminoisoindolinone, iminoisoindoline, quinacridone, flavanthrone, indanthrone, anthrapyrimidine, quinophthalone pigment, or a mixture or solid solution thereof.

12. A process of claim 1, wherein the organic pigment is selected from the group consisting of C.I. Pigment Red 202, C.I. Pigment Red 122, C.I. Pigment Red 179, C.I. Pigment Red 170, C.I. Pigment Red 144, C.I. Pigment Red 177, C.I. Pigment Red 254, C.I. Pigment Red 255, C.I. Pigment Red 264, C.I. Pigment Brown 23, C.I. Pigment Yellow 109, C.I. Pigment Yellow 110, C.I. Pigment Yellow 147, C.I. Pigment Yellow 191.1, C.I. Pigment Yellow 74, C.I. Pigment Yellow 83, C.I. Pigment Yellow 13, C.I. Pigment Orange 61, C.I. Pigment Orange 71, C.I. Pigment Orange 73, C.I. Pigment Orange 48, C.I. Pigment Orange 49, C.I. Pigment Blue 15, C.I. Pigment Blue 60, C.I. Pigment Violet 23, C.I. Pigment Violet 37, C.I. Pigment Violet 19, C.I. Pigment Green 7, and C.I. Pigment Green 36, or a mixture or solid solution thereof.

13. A process of claim 1, wherein the inorganic filler has a mean particle size in the range from 8 to 12 $\mu$m with 95% of the particles having a largest dimension of 50 $\mu$m or less prior to air jet milling.

14. A process of claim 11, wherein the organic pigment has an average particle size in the range from 0.005 to 3 $\mu$m prior to the air jet milling step.

15. A process of claim 1, wherein the pigment composition contains from 0.05 to 20 parts by weight of a texture-improving agent selected from the group consisting of fatty alcohols and fatty acids having at least 12 carbon atoms, or amides, esters or salts thereof; ethoxylated fatty alcohols, aliphatic 1,2-diols, polyols, polyvinylpyrrolidone, polyacrylic acid and copolymers thereof; epoxidized soya bean oil; waxes; resin acids and resin acid salts.

16. A process of claim 1, wherein the pigment composition contains from 0.5 to 8 parts by weight of a rheology-improving agent.

17. A process for preparing a pigmented high molecular weight organic material, which comprises:

(a) air jet milling from 1 to 40 parts by weight of an inorganic filler in the presence of from 60 to 99 parts by weight of an organic pigment to yield a pigment composition which is a uniform blend of the inorganic filler and the organic pigment; and (b) incorporating an effective pigmenting amount of the pigment composition into the high molecular weight organic material.

18. A process of claim 17, wherein the high molecular weight organic material is selected from the group consisting of cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine/formaldehyde resins, urea/formaldehyde resins, epoxy resins, diene rubbers and copolymers thereof.

19. A process of claim 17, which comprises incorporating the pigment composition into an automotive paint system.

20. A process of claim 17, wherein the high molecular weight organic material is a plastic which is calendared, cast, molded or processed to fibers.

21. A process of claim 18, wherein the high molecular weight organic material is a coating composition and the pigment composition is incorporated into the coating composition as a stir-in pigment.

22. A pigment composition which is a uniform blend comprising from 60 to 99 parts by weight of an organic pigment and from 1 to 40 parts by weight of an inorganic filler, wherein the sum of the parts by weight of the organic pigment and inorganic filler is 100, and wherein the largest dimension of 95 percent of the particles in the pigment composition is 18 μm or less, which is prepared by air jet milling the inorganic filler in the presence of the organic pigment.

23. A pigment composition of claim 22, wherein the largest dimension of 95 percent of the particles in the pigment composition is 14 μm or less.

24. A pigment composition of claim 23, wherein the largest dimension of 95 percent of the particles in the pigment composition is 10 μm or less, and wherein the pigment composition has a unimodal laser diffraction particle size distribution pattern with a maximum in the range from 0.2 to 5 μm, or a bimodal laser diffraction particle size distribution pattern with a first maximum in the range from 0.2 to 2.5 μm and a second maximum in the range from 3.2 to 8 μm.

25. A pigment composition of claim 24, wherein the inorganic filler is selected from the group consisting of mica, kaolin, talc, wollastonite and a natural or synthetic silica; or a mixture thereof.

26. A pigment composition claim 25, wherein the organic pigment is an azo, azomethine, methine, anthraquinone, phthalocyanine, perinone, perylene, dioxazine, diketopyrrolopyrrole, thioindigo, iminoisoindolinone, iminoisoindoline, quinacridone, flavanthrone, indanthrone, anthrapyrimidine, quinophthalone pigment, or a mixture or solid solution thereof.

27. A pigment composition of claim 26, wherein the organic pigment is selected from the group consisting of C.I. Pigment Red 202, C.I. Pigment Red 122, C.I. Pigment Red 179, C.I. Pigment Red 170, C.I. Pigment Red 144, C.I. Pigment Red 177, C.I. Pigment Red 254, C.I. Pigment Red 255, C.I. Pigment Red 264, C.I. Pigment Brown 23, C.I. Pigment Yellow 109, C.I. Pigment Yellow 110, C.I. Pigment Yellow 147, C.I. Pigment Yellow 191.1, C.I. Pigment Yellow 74, C.I. Pigment Yellow 83, C.I. Pigment Yellow 13, C.I. Pigment Orange 61, C.I. Pigment Orange 71, C.I. Pigment Orange 73, C.I. Pigment Orange 48, C.I. Pigment Orange 49, C.I. Pigment Blue 15, C.I. Pigment Blue 60, C.I. Pigment Violet 23, C.I. Pigment Violet 37, C.I. Pigment Violet 19, C.I. Pigment Green 7, and C.I. Pigment Green 36, or a mixture or solid solution thereof.

28. A pigment composition of claim 24, which comprises from 5 to 35 parts by weight of the filler and from 65 to 95 parts by weight of the organic pigment.

29. A pigment composition of claim 27, which comprises from 10 to 30 parts by weight of the filler and from 70 to 90 parts by weight of the organic pigment.

* * * * *